(No Model.) 2 Sheets—Sheet 1.
H. LEIBE.
HARNESS SADDLE.
No. 412,516. Patented Oct. 8, 1889.
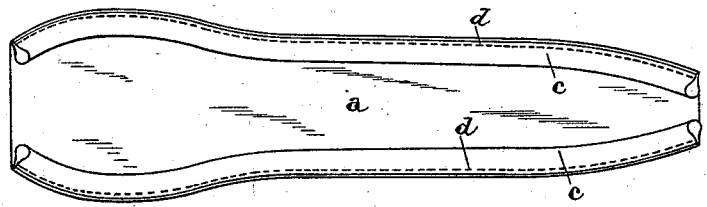
Fig.1.
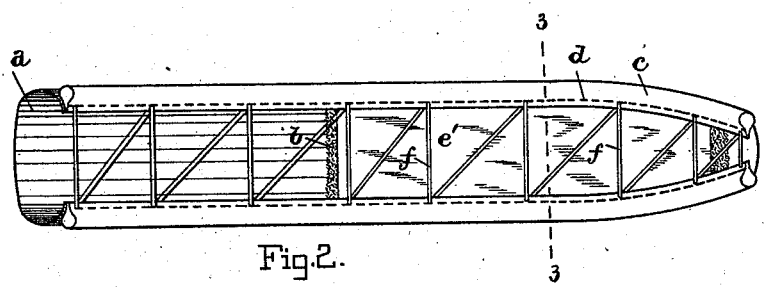 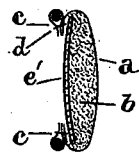
Fig.2. Fig.3.
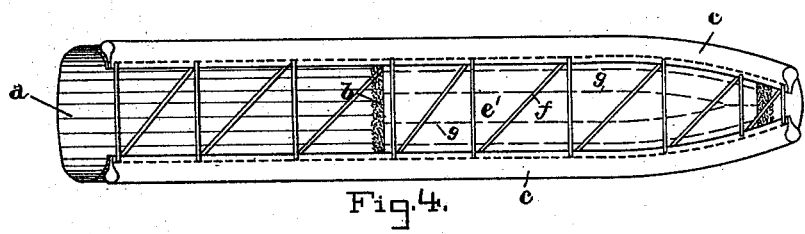
Fig.4.
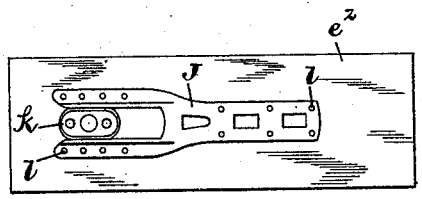
Fig.5.
WITNESSES:
A. O. Babendreier.
John E. Morris
INVENTOR:
Hugo Leibe
BY Chas B. Mann
ATTORNEY.

(No Model.) 2 Sheets—Sheet 2.

H. LEIBE.
HARNESS SADDLE.

No. 412,516. Patented Oct. 8, 1889.

WITNESSES:
A. O. Babendreier.
John E. Morris.

INVENTOR:
Hugo Leibe
BY Chas B. Mann
ATTORNEY.

UNITED STATES PATENT OFFICE.

HUGO LEIBE, OF BALTIMORE, MARYLAND.

HARNESS-SADDLE.

SPECIFICATION forming part of Letters Patent No. 412,516, dated October 8, 1889.

Application filed May 28, 1889. Serial No. 312,431. (No model.)

*To all whom it may concern:*

Be it known that I, HUGO LEIBE, a citizen of the United States, residing at Baltimore, in the State of Maryland, have invented certain new and useful Improvements in Harness-Saddles, of which the following is a specification.

My invention relates to an improved harness-saddle, and is illustrated in the accompanying drawings, in which—

Figure 6:
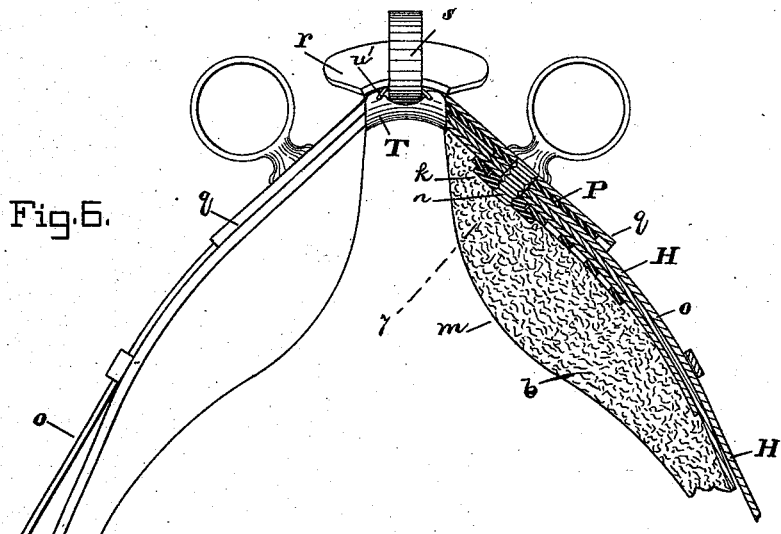
Figure 8:
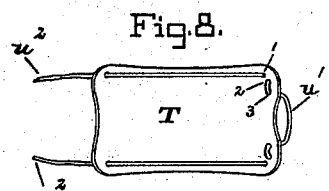
Figure 7:
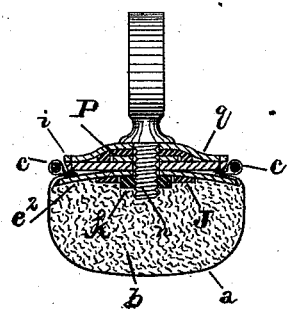
Figure 9:
Figure 10:
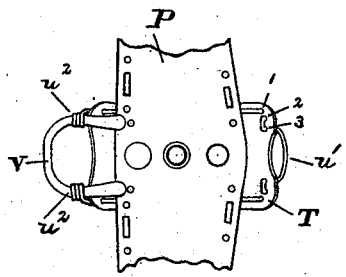

Figure 1 is a view of the cover of the pad and the reed-covers stitched thereto. Fig. 2 is a view of the back of the pad with the thread cross-loops connecting the two opposite reed-covers. Fig. 3 is a cross-section of same on the line 3 3. Fig. 4 shows the same as Fig. 2, with the addition of stitches which quilts the cover and felt padding to the spreader. Fig. 5 is a view of the upper section of the pad-spreader with the inside tree-plate attached. Fig. 6 is a view of the saddle, in which one side is shown in section. Fig. 7 is a cross-section of same on the line 7 7. Figs. 8, 9, and 10 are views showing the finishing-plate.

The letter $a$ designates the pad-cover, which rests upon the animal's back and confines the stuffing $b$. The reed-covers $c$ are secured, as usual, by stitches $d$ and the reeds inserted. The felt or other stuffing material $b$ is then placed on the inner surface of the pad-cover $a$. (See Fig. 2.) The pad-spreader is made in two sections $e'$ $e^2$. The lower section $e'$ of the pad-spreader is placed on the said stuffing material $b$, and each reed-cover is brought up, over, and upon the said pad-spreader $e'$, and the edges of the two reed-covers are then connected by the thread cross-loops $f$, which extend zigzag across the pad-spreader from one side to the other, as shown. This plan of making the pad-spreader in two separate sections—a lower and an upper—and also the plan of securing the pad-cover, stuffing, and pad-spreader by the said cross-loops $f$, connecting the two reed-covers, afford advantages. The latter-named plan secures the pad parts together and keeps them in proper shape while the stitches $g$ are run in, which quilts the pad, as shown in Fig. 4. This is the procedure when the back or flap stitching is to be done by machine; but when it is to be hand-stitched the thread cross-loops $f$ would extend along the entire length of the pad upper part as well. The back or leather flap H is then placed in position on the pad shown in Fig. 4 and stitched at $i$ by machine or by hand.

The inside metal tree-plate J, with the terret-nut $k$, is secured by nails $l$ to the upper section $e^2$ of the pad-spreader and on its lower surface. This is done previous to the insertion of the said spreader into the saddle. By this construction of pad-spreader the stitches $i$, along the upper thick part $m$ of the harness-saddle pad may be put in before the upper section $e^2$ of the pad-spreader has been inserted, which is much easier and better done. Furthermore, by attaching the metal plate J and nut to the lower side of the spreader, as stated, the spreader is stiffened longitudinally, and therefore can be more readily entered into the open top end of the pad, whose sides have been stitched at $i$, and pushed endwise in the pad without liability of breaking it; also, after the spreader is in place, the terret-screw $n$ will take into the said nut $k$, and by turning the terret its screw will draw up on the pad-spreader $e^2$ and cause the latter to yield better results. The back-band $o$ is attached as usual.

After the two pads have been made and the upper pad-spreader $e^2$ inserted they are attached to the tree P, which is covered by the leather jockey $q$, the terret-screws $n$ holding the parts, as already stated. The jockey-saddle $r$ and checkrein-hook $s$ are then secured as usual, and, finally, the finishing-plate T, made of any suitable material, is applied below to cover the top ends of the pads.

The construction here shown for attaching the finishing-plate is a feature of improvement. This consists of a wire, which is made fast to the plate T by being passed through holes 1 2 3 therein at each side, so that the said wire will form a loop $u'$ at one end of the plate and two free ends $u^2$ at the other end. By this construction the finishing-plate may have a loop $u'$ of a size to exactly fit the checkrein-hook $s$, to which it is to be attached, and thus an objection is avoided which appertains to a finishing-plate whose loop is integral with it. The loop $u'$ is slipped over the checkrein-hook $s$ and the finishing-plate T placed in proper position below, and then the free ends $u^2$ of the wire are wrapped and secured tightly about the usual crupper-loop $v$ at the rear side of the saddle, as shown in Fig. 10.

Having described my invention, I claim—

1. A harness-saddle having a pad provided with the stuffing $b$ and cover $a$, and a pad-spreader in separate lower and upper sections $e'$ $e^2$, placed end to end, and the latter section having the inside tree-plate J and terret-nut $k$ attached to it.

2. A harness-saddle having a checkrein-hook $s$ and a crupper-loop $v$, and below these a finishing-plate T, having holes at each side and a wire passed through said holes and forming a loop $u'$, which fits the said hook, and having its ends secured tightly about the said crupper-loop, as set forth.

In testimony whereof I affix my signature in the presence of two witnesses.

HUGO LEIBE.

Witnesses:
 JOHN E. MORRIS,
 R. L. CLEMMITT.